United States Patent [19]
Karlsson

[11] 3,968,559
[45] July 13, 1976

[54] METHOD AND ARRANGEMENT FOR ASSEMBLY OF COMPONENT PARTS, PREFERABLY FOR MOTOR VEHICLES

[75] Inventor: Sven Torgny Karlsson, Ockero, Sweden

[73] Assignee: AB Volvo, Goteborg, Sweden

[22] Filed: May 15, 1973

[21] Appl. No.: 360,586

[30] Foreign Application Priority Data
May 19, 1972 Sweden.............................. 6607/72

[52] U.S. Cl................................ 29/430; 29/200 A; 29/208 F; 180/98
[51] Int. Cl.[2].................... B23P 19/04; B23P 21/00; B60L 27/00; B60L 27/04
[58] Field of Search.............. 29/430, 200 R, 200 A, 29/429, 200 J, 208 R, 208 F; 180/98

[56] References Cited
UNITED STATES PATENTS

| | | | |
|---|---|---|---|
| 1,750,130 | 3/1930 | Romine............................ | 29/200 A |
| 1,876,759 | 9/1932 | Romine............................. | 29/200 A |
| 2,779,092 | 1/1957 | Gordon............................. | 29/200 A |
| 3,474,877 | 10/1969 | Wesener................................ | 180/98 |
| 3,564,702 | 2/1971 | Hurn et al.......................... | 29/200 A |
| 3,610,363 | 10/1971 | Hartley.................................. | 180/98 |
| 3,631,578 | 1/1972 | Shangler........................... | 29/200 R |
| 3,669,206 | 6/1972 | Tax et al.............................. | 180/98 |

Primary Examiner—C. W. Lanham
Assistant Examiner—Dan C. Crane
Attorney, Agent, or Firm—Brumbaugh, Graves, Donohue & Raymond

[57] ABSTRACT

A method of assembling individual units of automobiles in an assembly line in which each unit or parts of the unit are transported on individual motor-driven transport cars, the movement of the cars being individually controlled by signals from control wires connected with a control center and running in the direction of the line. The invention also comprises an apparatus as well as a transport car to be used in said method.

15 Claims, 4 Drawing Figures

METHOD AND ARRANGEMENT FOR ASSEMBLY OF COMPONENT PARTS, PREFERABLY FOR MOTOR VEHICLES

BACKGROUND OF THE INVENTION

It has been known for a long time to assemble automobiles in so-called assembly lines to achieve, on the one hand, a maximum of finished pieces and, on the other hand, a uniform quality, so that replacement parts are interchangeable in each automobile. The characteristic feature of such assembly lines is that a moving track moves at a predetermined rate along the line, so that the parts being assembled are brought with each timed movement from one work station to another, until at the end of the line a completely assembled vehicle rolls off the track. The intervals during which the track is moved are of critical importance for the division of assembly work, because at each of the work stations the required work must be completed within this interval. This work can only be performed by people. So in this assembly system, people are made into integral parts of a machine. This situation is understandably unfavourable in many respects, not to mention the psychological considerations.

Therefore, it has been a goal for a long time to find a way of assembling motor vehicles which avoids these disadvantages, while achieving at least equal capacity and quality.

Until now the technical world has made the assumption that the track in such an assembly line must be an inseparable functional entity and therefore the work rate along the whole length of the line must be uniform.

The inventor of the present invention had the boldness to break through this thinking barrier and to look for a solution by turning away from previous systems.

According to the invention, the solution lies fundamentally in the idea of dividing up the previously connected track into a plurality of individual cars, and to steer said cars along the assembly line according to a principal so that as is required they are either driven along the assembly line or are shunted off to adjacent stations and from there back to the line. This eliminates the strict work rate during assembly and people are removed as component parts of the machine, now making possible cooperation between more people in groups where previously each worker had to complete his always unvarying hand movements in practical isolation. People are no longer component parts of the machine; rather, they have individually or preferably in a group the ability to make decisions and have responsibility. Furthermore, the cases of absenteeism will not be as troublesome as they were previously. But in regard to capacity and quality, the invention also has considerable advantages. Up to now if a major error occurred at any of the work stations, the entire line had to be shut down until the error was corrected. For this reason, it is usual to allow minor assembly errors, which can be corrected later, to pass to the end of the line. In order to correct these errors afterwards, subsequently assembled parts must often be disassembled. Such minor errors occur often, making the assembly appreciably more time-consuming and costly.

SUMMARY OF THE INVENTION

In the invention such disadvantages are avoided, because it is not necessary to hold to a strict work rate. According to the invention, in the assembly of the units a method is used in which each unit or parts of the unit are placed and transported on individual motor-driven transport cars. Movement of the cars is individually controlled as to direction and speed with the help of signals from at least one control wire connected with a control center and running in the direction of the line.

An apparatus for assembly of units transported along an assembly line is characterized according to the invention by a plurality of cars steered along the line, said cars being provided with a suspension means for the units, at least one motor-driven wheel steered by a steering device, at least two additional wheels, and at least one signal receiver for control of the car; and by at least one control wire running along the assembly line and working in conjunction with the signal receiver of the car.

A transport car useable for the apparatus is characterized by being provided in the area of the front and rear ends with at least one drivable wheel which is steerable by means of a steering device and at least one additional pivotable wheel. When moving in the longitudinal direction of the car, at least one of the driven wheels serves to steer the car according to its angular setting. When moving transversely to its longitudinal direction, the steering of the car is effected by the driven wheels being set in a running position essentially transversely to the longitudinal direction of the car, at least one of these wheels being controlled as to its speed of rotation.

DESCRIPTION OF THE DRAWINGS

The invention will be described in more detail with reference to the accompanying drawings, in which.

DESCRIPTION OF THE PREFERRED EMBODIMENT FOR THE PREFERRED PRACTICE OF THE METHOD

Figure 1:
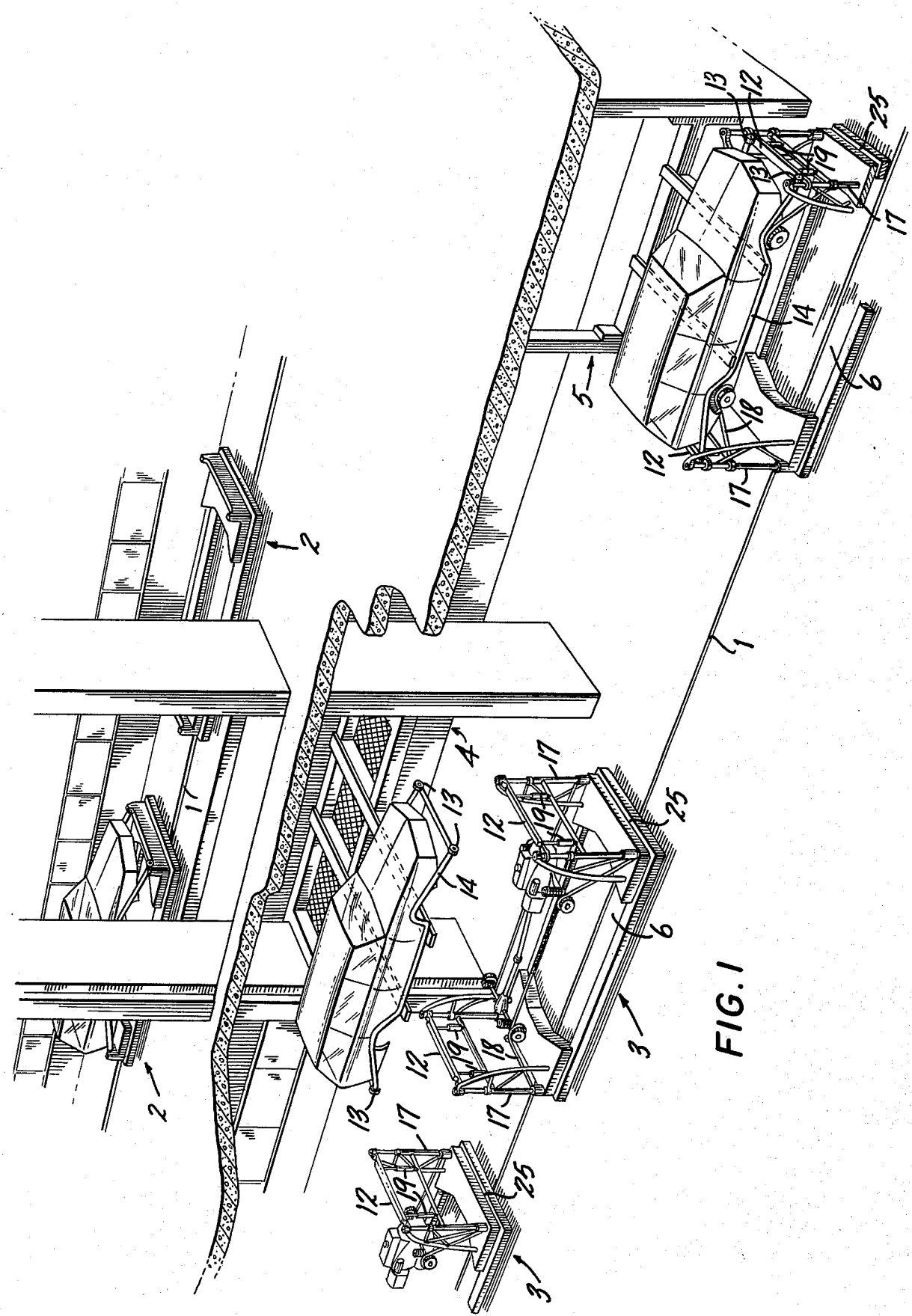
FIG. 1 shows an assembly hall for automobiles with two different assembly lines and transport cars, one for bodies and the other for chassis and body-chassis.

FIG. 1 shows a portion of an assembly arrangement for automobiles which on an upper level has an assembly line for bodies and on a lower level has a line for chassis and body-chassis. An electric wire 1 runs along the upper as well as the lower line, which wire is preferably embedded in a rubber mat. Driverless transport cars 2 and 3 are moved along the wire on each level, the cars 2 on the upper level carrying bodies and the cars 3 on the lower level carrying chassis as well as both the bodies and chassis. The FIGURE illustrates how a body from the upper level with the help of an elevator arrangement generally designated by 4 is placed on a car 3, which already carries a chassis. Farther along the line, there is another elevator arrangement 5 with the help of which the chassis is lifted up towards the body.

Figure 4:
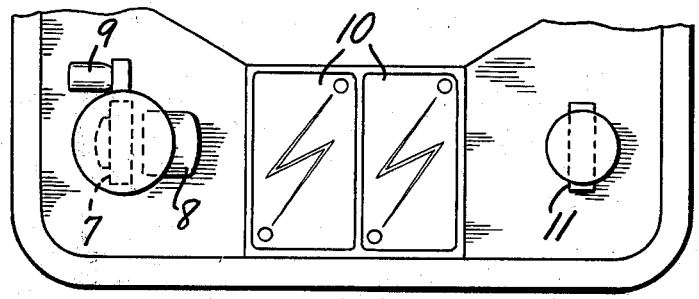
FIG. 4 a schematic plane view of one end of the cars shown in FIGS. 1–3.

Each of the cars 2, 3 has a frame 6 with means for carrying various parts of a car, as will be described later. The cars are in principal constructed identically at both ends and in FIG. 4 one end of a car is shown schematically, which contains a drive wheel 7 with a drive motor 8, steering motor 9, batteries 10 and a traversing wheel 11.

Figure 2:
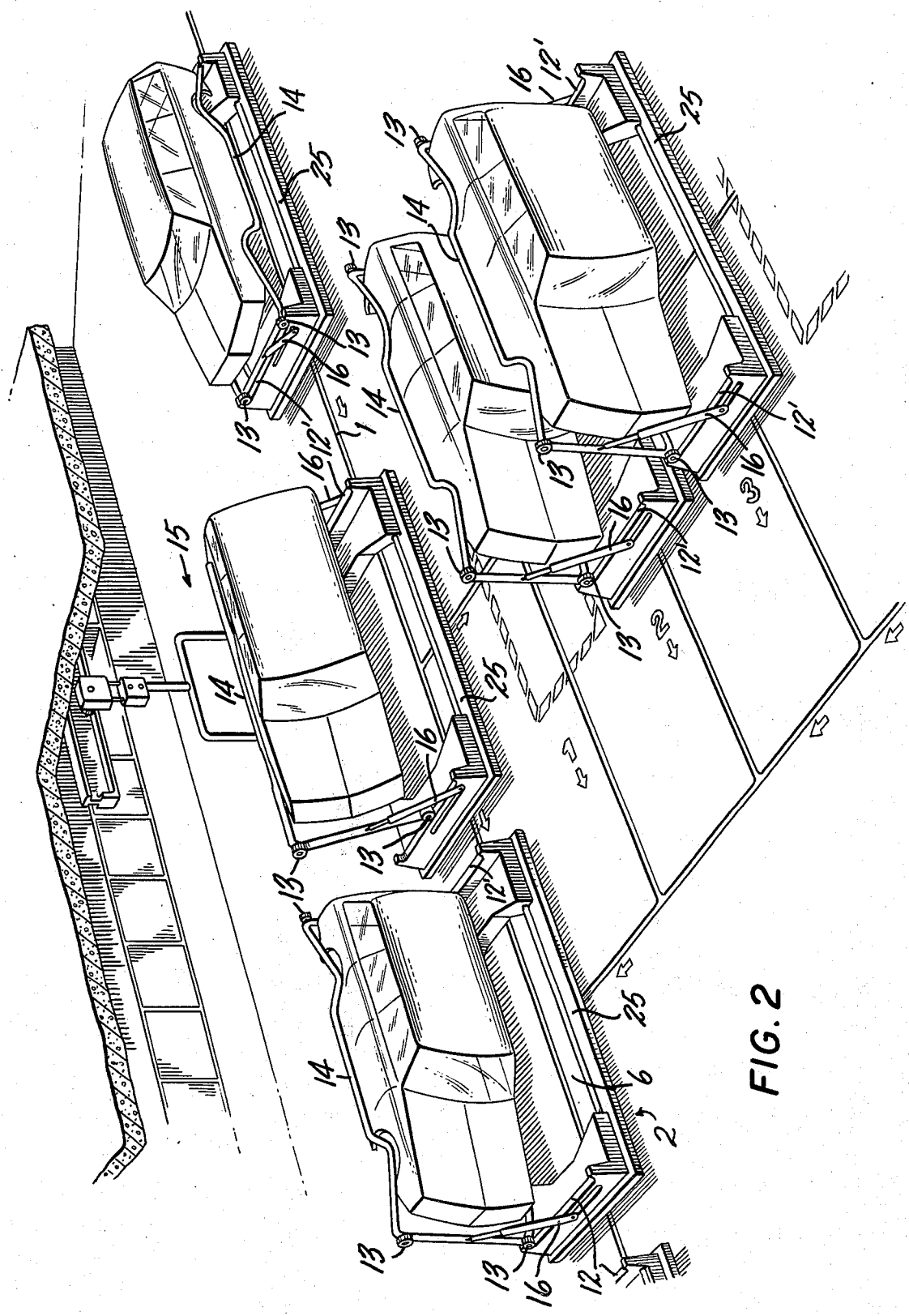
FIG. 2 a view similar to FIG. 1 of another part of the body line.

The drive wheel 7 can be turned with the help of the steering motor 9 for driving in the desired direction. The steering motor 9 receives steering orders either from an electronic control unit (not shown) dependent on the sensed position relative to the control wire 1, or directly from manual operating means (not shown) coupled to the driving and steering motors of the car. The control unit as well as the manual operating means can consist of electronic devices which are known per se. The other end of the car differs from that described above essentially only in that the drive wheel 7 is placed on the opposite side so that both of the car's drive wheels are diagonally arranged. Both of the traversing wheels 11 are freely turnably journalled and automatically assume the correct alignment. The drive wheels 7 are adjustable and lockable at 90° to the longitudinal direction of the car to enable the car to be moved transversely. Steering is effected by the difference in rotational speed between the wheels. Of the two drive wheels 7, only one is variably adjustable within a definite angle, preferably between a position for driving straight forward and a position for driving transversely, while the other wheel 7 can only be set in one or the other of these two positions. FIG. 2 shows how the cars are driven both longitudinally and transversely.

The control units in the respective cars are programmed so that all of the cars can be controlled synchronically along the wire, at the same time as the control of individual cars is made possible. This can be achieved by methods which are known per se in electronics, for example by a certain frequency in the electric wire giving a definite control order to one car, while the other cars remain unaffected. For example, certain or individual cars can be given the instruction to move away from the main line onto a "siding", as is shown in FIG. 2, for example. Furthermore, the control unit can be programmed so that by an impulse a car can be given the instruction to deviate transversely completely away from the control wire and drive a certain distance from the line before it stops, whereafter the operation can be taken over by an assembler who with the help of the manual control means can drive the car to the appropriate storage place.

The control wire can furthermore be divided into a plurality of sections, of which, for example, some can be made dead and some live, so as to only affect cars within a certain section. In general, one can by exploiting known technique per se within electronic control and data engineering, achieve a number of variational possibilities for controlling the cars collectively as well as individually from a control center via an electric wire.

To the frame 6 of the car 2, two transverse rails 12 are attached, which are designed to support trundles 13 which are rotatably journalled on two longitudinal support beams 14 which are connected to each other. They are designed to be attached to a body, preferably on its ordinary lifting bracket. As FIG. 2 shows, especially the bodies can, by the use of the described construction, be transported either in the normal position or in a tipped position. In tipping, the support beams 14 are coupled to a stationary tipping device (generally designated by 15), whereby one pair of trundles 13 rolls on the rails 12 to an end position in which the support beams are fixed with the help of beams 16 disposed on the car 2.

The cars 3 have, as do the cars 2, transverse rails 12, but these are disposed on racks 17 so as to be able to be raised and lowered to achieve an elevated placement of the body (see FIG. 1). On a level under the rails 12 on both of the racks 17, there is a fixture 18 for a chassis which can be raised and lowered. The moving of the fixture vertically is done with the help of the outer stationary elevator arrangement 5 while the movement of the rails is controlled by hydraulic cylinders 19 connected to the respective racks 17.

During assembly, the body is thus moved from the cars 2 to the cars 3 for assembly with the chassis. Thereafter the two assembled units are moved back to the car 2.

As is evident from the Figures, the frame 6 on the cars 2 and 3 is in the form of a platform which can be used as a work platform by the assemblers.

Figure 3:
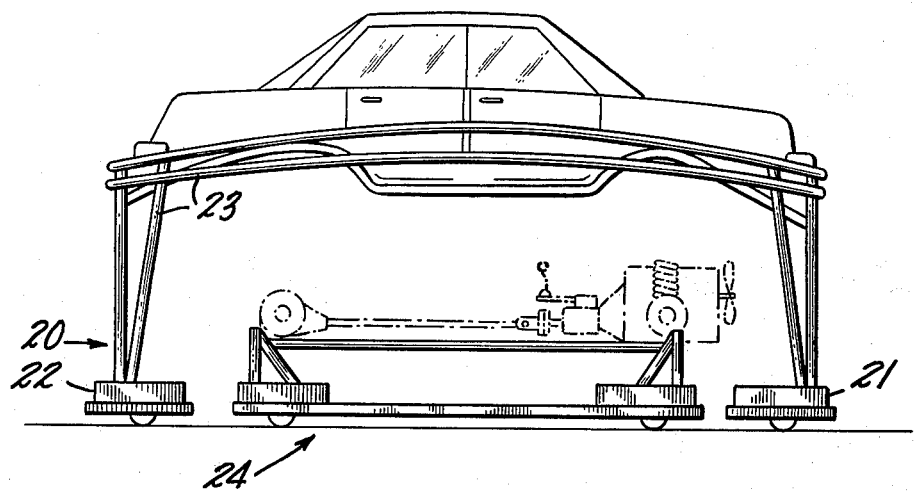
FIG. 3 an alternative embodiment of a body car and a chassis car usable in the method according to the invention.

In FIG. 3, an alternative embodiment of the cars is shown which can be used in the method according to the invention. A car 20 carries a body which can be raised and lowered. The car 20 consists of a forward and a rear member 21 and 22 respectively, which are provided with wheels, and which are connected to each other by means of a frame member 23. In the open space between the members 21 and 22 a chassis car 24 is driven for assembling of the body and chassis, whereafter the chassis car is driven away.

The cars described are provided with touch sensitive means which activate an emergency brake. These means (not shown) can be arranged around the cars in such a way that only those means are activated which face forward when the car is moving. Also, a resilient bumper 25 can appropriately be arranged. Distance detecting means can also be disposed on each car, by means of which a certain distance between the cars can be maintained.

It will of course be appreciated that many modifications can be made within the scope of this invention provided that they can meet with the functional necessities of the invention.

What I claim is:

1. A method of assembling units, such as bodies, chassis and motors of automobiles, in which each of a plurality of incomplete units is moved forward along a main assembly line to successive assembly stations for the addition of components to the unit until the unit is complete, the method comprising placing and transporting each incomplete unit on a different one of a plurality of individually motor-driven transport cars, the transporting being along a path through the successive assembly stations, adding components to each unit while it remains placed on its transport car at at least some of such stations, and individually controlling the movement of the transport cars between the stations by signals from at least one control wire connected with a control center and running in the direction of the main assembly line whereby the speed of assembling the components to each unit at the assembly stations is independent of the speed of assembling the components to other units.

2. A method according to claim 1, and additionally comprising coupling the incomplete units to fixtures carried on the transport cars, which fixtures are adjustable to various angular positions, and thereafter setting each fixture in a selected angular position.

3. A method according to claim 1, wherein each unit is a chassis of a vehicle which is first placed on a transport car, and additionally comprising placing a body of a vehicle on the transport car in a position at a distance above the chassis and then bringing the chassis and the body together for connection to one another while on the transport car.

4. A method according to claim 1, and further comprising the step of individually selecting and switching selected ones of the transport cars onto a branch assembly line, assembling components on the units along the branch assembly line and returning the transport cars to the main assembly line without changing the orientation of the selected transport cars relative to the main assembly line.

5. A method according to claim 1, wherein an assembly line includes the main assembly line and a plurality of branch assembly lines branching off from the main assembly line, at least some of the assembly stations being located along the branch assembly lines and additionally comprising selectively moving at least some of the transport cars off the main assembly line onto and along the branch assembly lines whereby said assembly stations where components are added to the units and the sequence of units at said assembly stations is selected in dependence upon said selective moving of said transport cars.

6. A method of assembling units, such as bodies, chassis and motors of automobiles, each unit having a plurality of components, comprising:
   a. placing at least a first component of each of a plurality of units on a different one of a plurality of individually controlled and individually motor-driven transport cars, each transport car being without a mechanical connection to any other transport car,
   b. directing the transport cars along an assembly line to a first assembly station, the transport cars being controlled individually as to direction and speed by signals from at least one control wire connected to a control center and extending in the direction of the assembly line,
   c. assembling at least a second component of a unit with the first component on each transport car at the first assembly station,
   d. directing each of the transport cars along the assembly line to at least one succeeding assembly station, and
   e. assembling at least one additional component of a unit with the first and second assembled components on each transport car at each succeeding assembly station to which each transport car is directed.

7. A method of assembling motor vehicles comprising the steps of:
   a. placing at least a first component of each of a plurality of motor vehicle chassis on a different one of a first plurality of individually controlled and individually motor-driven transport cars, each transport car being without a mechanical connection to any other transport car,
   b. directing each of the first plurality of transport cars along a first assembly line to a first assembly station, said transport cars being controlled individually as to direction and speed by signals from at least one first control wire connected to a control center and extending in the direction of the first assembly line,
   c. assembling at least a second component of a chassis with the first component on each of the first plurality of transport cars at the first assembly station,
   d. directing each of the first plurality of transport cars along the first assembly line to at least one succeeding assembly station,
   e. assembling at least one additional component of a chassis with the first and second assembled components on each of the first plurality of transport cars at each succeeding assembly station to which each of said transport cars is directed,
   f. concurrently with at least one of steps (a), (b), (c), (d) and (e), directing each of a second plurality of individually controlled and individually motor-driven transport cars along a second assembly line located above the first assembly line, each of the second plurality of transport cars being without a mechanical connection to any other of said transport cars and carrying at least one component of a body for a motor vehicle, said second plurality of transport cars being controlled individually as to direction and speed by signals from at least one second control wire connected to a control center and extending in the direction of the second assembly line, and
   g. at a predetermined point, removing motor vehicle bodies from the second plurality of transport cars and conveying said bodies in a downward direction onto different ones of the first plurality of transport cars so that individual bodies can be coupled to individual chassis supported on the first plurality of transport cars.

8. Apparatus for assembling motor vehicles comprising a multiplicity of motor-driven transport cars, each of which is adapted to receive an individual one of a multiplicity of incomplete units of the motor vehicles, means for controlling the movement of each of the transport cars independently of the movement of any of the others of the transport cars such that each transport car may be moved along an assembly line at a pace that is independent of the movement of any of the other transport cars along the assembly line, whereby assembly operations may be performed on each motor vehicle along the assembly line at a pace which is independent of assembly operations on the other motor vehicles, and means located at each of a multiplicity of assembly stations along the assembly line for performing the assembly operations on the incomplete units of the vehicles on the transport cars to add elements to the incomplete units.

9. Apparatus for the assembly of units, such as bodies, chassis and motors of motor vehicles, having a plurality of component parts, said apparatus comprising:
   a. at least one first control wire defining a first flow path,
   b. means at assembly stations positioned along the length of the control wire for adding component parts to the units, and
   c. a first plurality of separate, individually controllable transport cars adapted to travel along the first flow path, each of the first plurality of transport cars including:
      i. a first suspension means for supporting a unit,
      ii. a motor,
      iii. at least one wheel driven by the motor,
      iv. at least two additional wheels, v. means for steering at least one of the wheels, and
vi. at least one means for receiving control signals from the first control wire, the receiving means being coupled to the motor and the steering means and being adapted to control the speed and direction of the transport car in response to the control signals from the first control wire whereby the component parts are assembled to the units, while the units are supported on the transport cars, at an individual speed corresponding to the individual control of said transport cars.

10. Apparatus according to claim 9, also comprising:
d. at least one second control wire supported above said at least one first control wire and defining a second flow path above the first flow path,
e. a second plurality of separate, individually controllable transport cars adapted to travel along the second flow path, each of said second plurality of transport cars including:
i. suspension means for supporting a unit,
ii. a motor,
iii. at least one wheel driven by the motor,
iv. at least two additional wheels,
v. means for steering at least one of the wheels, and
vi. at least one means for receiving control signals from the second control wire, the receiving means being coupled to the motor and the steering means and being adapted to control the speed and direction of the transport car in response to control signals from the second control wire; and
f. means for conveying a unit from one of the second plurality of transport cars downwardly onto one of the first plurality of transport cars.

11. Apparatus according to claim 10, wherein each of the first plurality of transport cars also includes:

vii. a second suspension means for receiving and supporting a unit from one of the second plurality of transport cars, and
viii. means for vertically raising and lowering the first suspension means.

12. Apparatus according to claim 11, wherein the first suspension means is located underneath the second suspension means.

13. Apparatus according to claim 10, also comprising a plurality of mounting frames each releasably attachable to a unit and adapted to be releasably coupled to a suspension means, and wherein each suspension means of the second plurality of transport cars includes means for tilting a mounting frame and an attached unit relative to an associated transpot car.

14. Apparatus according to claim 9, wherein at least some of the first plurality of transport cars also include floors positioned to provide work platforms underneath units supported by the first suspension means of said at least some of the first plurality of transport cars.

15. Apparatus according to claim 9, wherein some of the first plurality of transport cars have first suspension means positioned so as to support units at relatively short distances above a surface on which the transport cars travel and others of the first plurality of transport cars have first suspension means positioned so as to support units at relatively large distances above said surface, the others of the first plurality of transport cars also being constructed so that each of said others of the first plurality of transport cars can be driven over one of said some of the first plurality of transport cars and units supported on said others of the transport cars can thereby be positioned to overlie units supported on said some of the transport cars.

* * * * *